April 4, 1944.  L. J. BRASHER  2,345,788
TRACTION MOTOR CONTROL MECHANISM
Filed Feb. 25, 1942   4 Sheets-Sheet 3

Inventor
Lawrence J. Brasher,
By George Heideman
Attorney.

April 4, 1944.   L. J. BRASHER   2,345,788
TRACTION MOTOR CONTROL MECHANISM
Filed Feb. 25, 1942   4 Sheets-Sheet 4
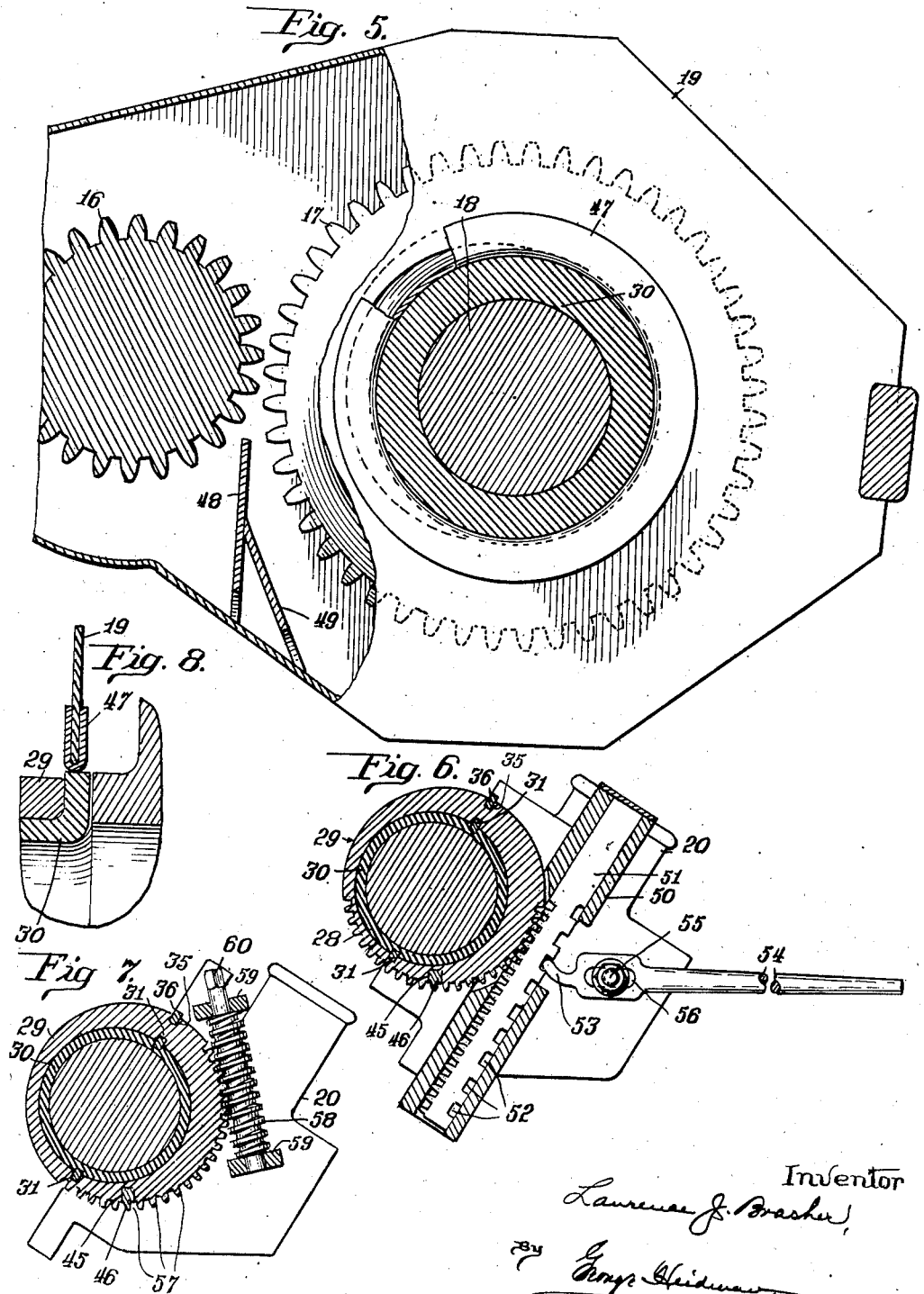

Patented Apr. 4, 1944

2,345,788

UNITED STATES PATENT OFFICE 2,345,788

TRACTION MOTOR CONTROL MECHANISM

Laurence J. Brasher, Topeka, Kans.

Application February 25, 1942, Serial No. 432,187

4 Claims. (Cl. 105—113)

My invention relates to the mechanism for controlling the operative position of the traction motors of Diesel locomotives as at present employed, namely traction motors of the axle-hung type having close overhead clearance and involving a standard gear train with predetermined pitch diameters and number of teeth determined by the necessary gear ratio of motor to axle.

The invention has for its object the provision of means whereby the operative relation between the motor and the axle may be quickly released with a minimum of labor and with a minimum of changes on the traction motors at present in service and without the introduction of an idler gear whose use is impracticable because of the space limitations mentioned.

In the operation of Diesel driven motors of high speed locomotives difficulties have been encountered during operation of a train as a result of a broken gear or pinion tooth, burnt-out or hot armature bearing, broken armature banding wire, or an obstruction getting into the motor and interfering with its free movement or operation, such difficulties usually occurring while en route where repairs are impossible with the result that at times the train is held on the road until the arrival of another locomotive, resulting in considerable loss of time.

With my improved mechanism the disabled motor may be quickly placed out of operative relation with the driving axle, permitting the locomotive to proceed under its own power obtained through the other motors of the locomotive.

The objects and advantages of my invention will be readily comprehended from the detailed description of the accompanying drawings wherein:

Figure 5 is a sectional view on an enlarged scale taken on the line 5—5 of Figure 1 and illustrating the motor housing shifted into gear disengaging position.

Figure 6 is a detail sectional view, on a reduced scale, illustrating a modification of the cam sleeve controlling means.

Figure 7 is a similar view illustrating another modification of cam sleeve controlling means.

Figure 8 is a detail sectional view of a portion of the gear case part of the motor housing illustrating means whereby oil tight relation with the axle suspension bearing or bronze may be obtained.

Figure 1:
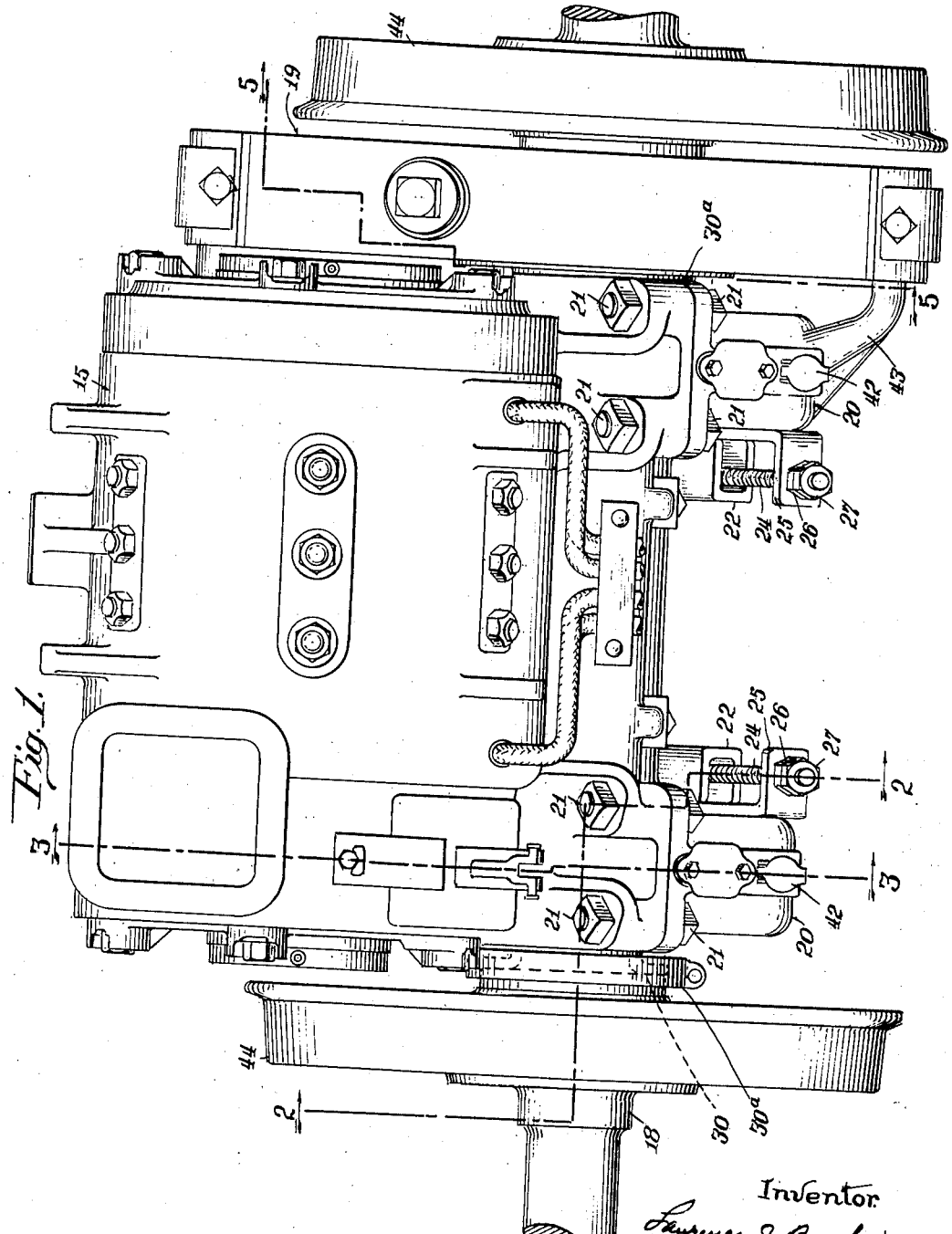
Figure 1 is a plan view of an axle-hung traction motor with my improvement; the motor being supported on the driving axle provided with the drive wheels.

My invention relates to mechanism for controlling the operative position of traction motors of the axle-hung type employed with Diesel locomotives at present in use; the invention being designed to overcome serious difficulties that have been encountered in connection with high-speed trains; difficulties, which have occurred while the train is en route and distant from repair shops, resulting from hot or burnt-out armature bearings, broken gear or pinion teeth, or from some obstruction getting into the motor. With the motor or armature shaft directly geared to the driving axle of the locomotive the motor may become locked to the axle with the result that continued travel would result in irreparable damage to the motor and other equipment. My invention contemplates means, which may be readily manipulated by the operating crew, whereby the driving relation between the armature pinion and the drive axle gear may be disrupted and the faulty or disabled motor thrown out of operation so as to permit the train to proceed with the power derived from the other motors of the locomotive.

The invention is applied to an axle-hung type of traction motor generally indicated at 15 whose armature shaft is provided with a pinion 16; but as the motor is of the conventional type detailed illustration and description thereof need not be entered into. The armature pinion 16 during normal service operation meshes with gear 17 which is operatively secured to the locomotive driving axle 18 which extends through the gear case 19 of the motor.

The traction motor 15 is provided with axle suspension caps 20, 20, which are secured to the motor housing by bolts 21. Each suspension cap is provided with an upwardly sloping guide 22 which slidably supports an elongated rack 23 provided at its upper end with a threaded extension 24 which passes loosely through the apertured arm or head portion 25 of the guide 22; the extension 24 being provided with nuts 26 (preferably one above and one below the arm portion 25) and a jam nut 27 whereby the adjusted relation between the nuts and the rack extension is maintained.

Figure 4:
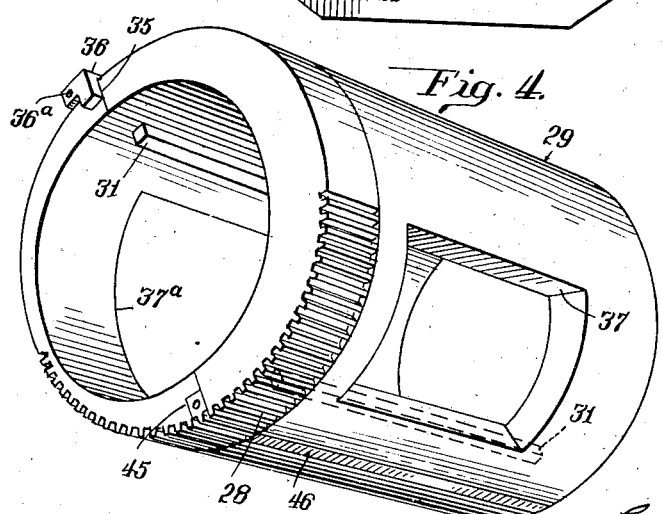
Figure 4 is a perspective view on an enlarged scale of a cam sleeve.

The teeth of rack 23 are in engagement with mated teeth 28 formed in an eccentrically bored cam sleeve 29, which, for convenience in assembly, preferably consists of half sections as shown in Figure 4. The sleeve 29 is rotatably arranged in each axle cap 20 and carries the standard bronze axle suspension bearings 30 and fits in an enlarged bore of the axle cap 20 and of the motor frame which is bored off center, for example, three-fourths of an inch off normal center of the driving axle 18 when in the operative position shown in Figure 2. The sleeve is adaptable for bronze or other friction reducing surface covering material to obtain free rotation in fit in caps and motor frame upon application of rotative forces. Suspension bearing 30 (also preferably made in half sections) at the outer end, is provided with a wide flange 30ᵃ which contacts the outer or wheel side of the housing and the bearing caps and constitutes a dust-guard for the eccentric or oblong opening in the housing and oil retaining cap at the truck-wheel side of the housing.

Figure 2:
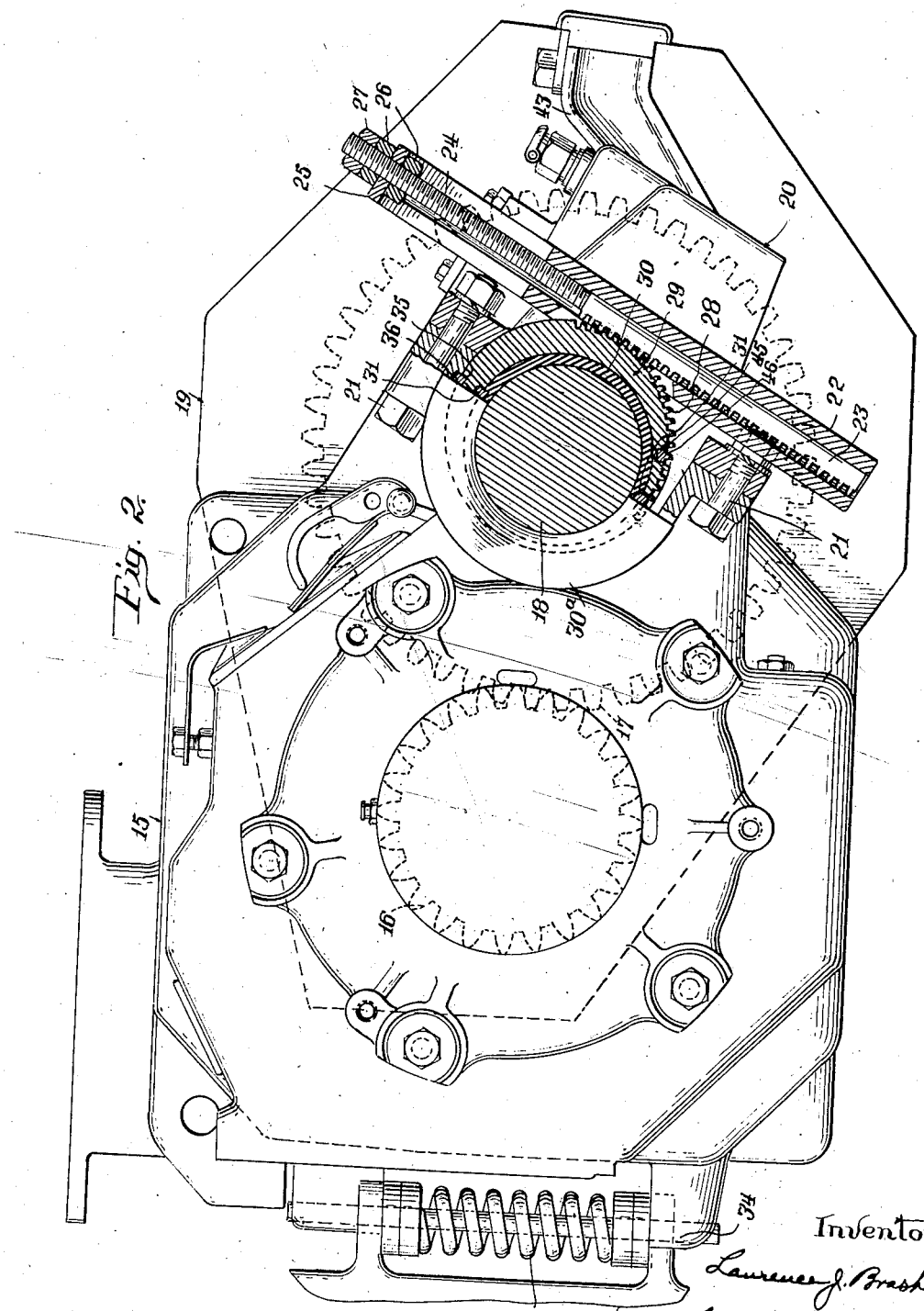
Figure 2 is a partial elevational and partial sectional view; the sectional view being taken on the line 2—2 of Figure 1 and drawn to a larger scale.

The axle bearing shell or bushing 30 is adapted to permit free rotation of the drive axle; the shell however being secured to the cam sleeve 29 against independent rotation by suitable keys 31 which extend into key-ways or slots formed in the outer surface of the shell; the bearing shell 30 being made to rotate with the cam sleeve 29 when the latter is rotated about the drive axle 18 for the purpose of shifting the motor housing with attached gear casing toward the truck transom, a portion of which is shown at 32 in Figure 2.

The motor housing is yieldingly supported by the usual springs, as shown at 33 (see Figure 2) which are supported by suitable lugs, as at 34, formed on the truck transom 32, in order to compensate for the torque and axle movement to which the motor is subjected during operation. As the method of mounting is the usual method and construction employed further detailed description need not be entered into. With the springs and their seats loosely supported by the transom lugs 34, sufficient play is provided to permit the motor housing to be shifted toward the transom, when cam sleeve 29 is rotated about the drive axle 18, and thereby move the motor or armature pinion 16, out of mesh with the axle drive gear 17 when occasion requires.

The cam sleeve 29 at a suitable point on its outer circumference is provided with a key-way or slot 35 extending from end to end (see Figure 4) to receive a key 36 which also enters a slot formed in the motor housing or frame and locks the cam sleeve 29 with its contained bearing shell or bushing 30 against rotation; the key 36 being preferably removably secured to the motor frame by means of a bolt which passes through the opening 36ᵃ in a lip formed on the key-head, see Figure 4.

The cam sleeve 29 at opposite sides is provided with openings or windows 37, 37ᵃ and the contained bearing shell or bushing 30 is also provided with windows 38, 38ᵃ registering with the windows 37, 37ᵃ of the sleeve 29; the windows 37 and 38 being intended to permit lubrication of the drive axle 18 when the sleeve and bushing are in normal position, while windows 37ᵃ, 38ᵃ permit the lubrication of the axle when the cam sleeve and associated bushing have been rotated about the axle sufficiently to move the armature pinion 16 out of operative relation with drive gear 17.

Figure 3:
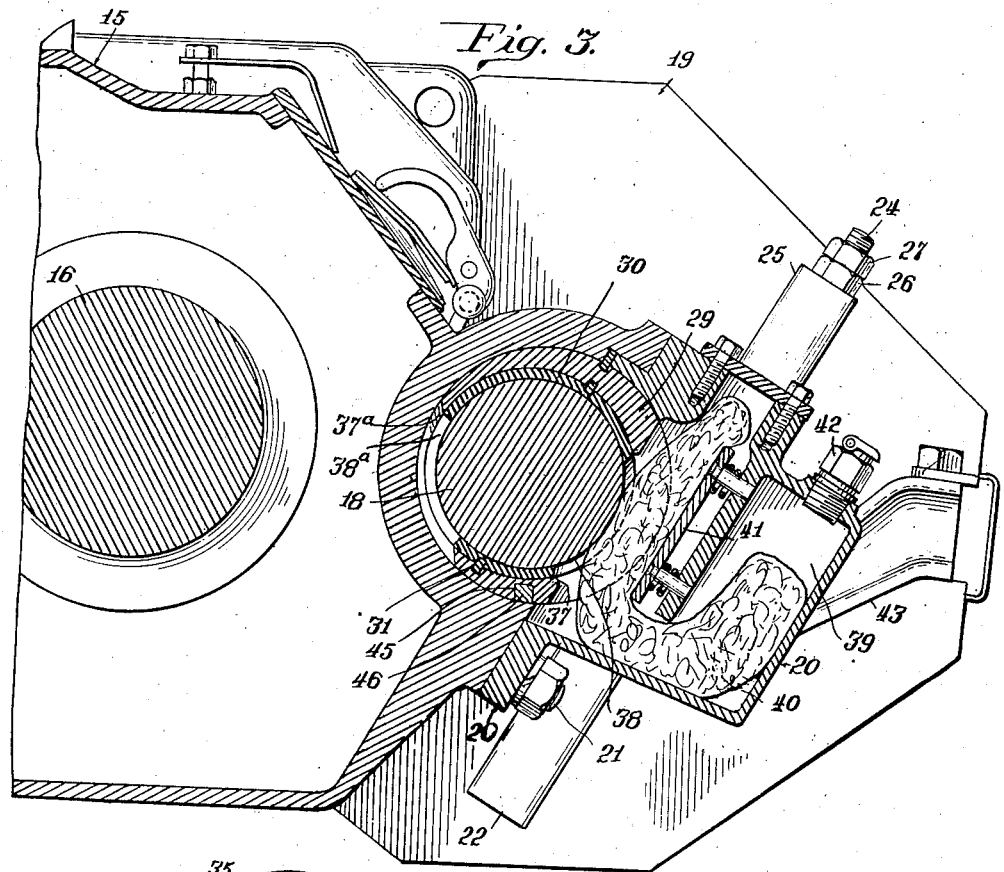
Figure 3 is a sectional view taken on the line 3—3 of Figure 1 looking in the direction of the arrows and drawn to a larger scale than Figure 1.

The suspension caps 20 of the motor housing are provided with oil or lubrication holding wells 39 (see Figure 3) provided with a suitable wick as at 40, whose upper end is held in position and forced through the windows in the sleeve 29 and bushing 30 and into contact with the axle 18 by a spring controlled member 41; the oil well being provided with a suitable fill-cap or plug at 42. One of the suspension caps 20 is provided with an arm 43 for securing the same to the gear case.

Cam sleeve 29, at or adjacent its inner end, namely the end disposed away from the axle-wheel 44, and at a predetermined point on its outer circumference beginning at the thinner wall side and extending partly throughout the thicker wall side is provided with the segmentally arranged teeth 28 which mesh with the teeth of rack member 23; the segmentally arranged teeth 28 extending a sufficient distance to be constantly in mesh with the rack member 23 and to also rotate the cam sleeve approximately one hundred and thirty-five or forty degrees, at which time the thicker wall side of the sleeve will be disposed toward the motor pinion, namely into the pinion and gear separating position shown in Figure 5.

In order to permit the cam sleeve 29 to be locked in its pinion and gear separating position, the cam sleeve 29 also is provided with a key-way or slot 45 which corresponds with the slot-way 35 normally containing key 36. As the cam sleeve 29 merely is intended to be rotated approximately one hundred and thirty-five degrees and in order that it may be locked in this rotated or pinion and gear separating position, the slot-way 45 extends through the segmentally arranged teeth 28 of the cam sleeve. In order to permit the sleeve to be sufficiently rotated by the rack member 23, I provide slot-way 45 with a toothed key or bar 46 which is removably secured to the cam sleeve in a suitable manner; the head of the key or bar 46 being provided with sufficient teeth to fill the gap or slot-way and to correspond with the teeth 28 on the sleeve.

When the motor housing is in normal operating position, namely with the motor or armature pinion 16 in mesh with the axle gear 17, the thick segmental wall portion of cam sleeve 29 will be on the side of axle 18 disposed away from the motor as shown in Figure 2; this position of the cam sleeve 29 being maintained by the key 36 which also extends into a slot-way in the motor housing, with its head or lip lapping the side of the housing and secured thereto by means of a bolt passing through the hole 36ᵃ in the lip and through a corresponding hole in the housing.

In the event of motor failure resulting from a burnt-out or hot armature bearing, broken armature banding wire, or some obstruction in the motor, or as a result of a broken pinion or gear tooth, the operative relation between the motor and truck axle may be quickly disrupted by first removing the lock bolt from hole 36ᵃ in key 36, and withdrawing key 36 from the slot-way (on the inner end of the bearing, namely on the side removed from the truck wheels) in the motor housing, then releasing jam nut 27 at the upper end of the threaded extension 24 of rack bar 23. The lowering or bottom nut 26 beneath arm or head 25 of guide 22 is then screwed down on the threaded extension 24 of the rack 23 and raising upper nut 26 (above arm 25 in Figure 2) is then screwed in a direction toward arm 25, namely in a direction which will cause the threaded extension 24 of the rack 23 to move upwardly from its normal position shown in Figure 2. Such movement of the rack bar will cause cam sleeve 29 to move in counterclockwise direction in Figure 2 and this rotation is continued until slot-way 45 with the toothed bar 46 are in register with the slot-way 36 in the motor housing from which key 36 has been withdrawn, at which time the toothed bar 46 is withdrawn (from the side removed from the axle wheel) and key 36 inserted in the slot-way so as to lock the cam sleeve in its rotated position. As previously stated, the side walls of the motor housing are provided with enlarged openings in which the cam sleeve is located thus permitting rotation of the cam sleeve as mentioned. Such rotation of the cam sleeve moves the enlarged or thick wall portion of the sleeve to the opposite side of the drive axle 18 from that shown in Figure 2, thereby forcing the motor 15 toward the truck transom 32 and moving armature pinion 16 out of mesh with the axle gear 17, namely into the position shown in Figure 5; the wall portion of cam sleeve 29 being of predetermined thickness sufficient to induce complete disengagement of pinion 16 from axle gear 17. The bearing sleeve or bushing 30 at its outer or wheel end is provided with the flange 30ᵃ which is of size sufficient to cover the enlarged opening in the side wall of the motor housing so as to prevent ingress of foreign matter. As bearing sleeve or bushing 30 is keyed to cam sleeve 29 by the keys 31, bearing sleeve 30 will also rotate with the cam sleeve 29 so that the windows 37ᵃ and 38ᵃ will continue to be in register with each other and will then be positioned adjacent lubricating wick 40 so that proper lubrication of the truck axle 18 may be had for its continued rotation in bearing sleeve or bushing 30. After the cam sleeve has been rotated as heretofore described, the lower nut 26 on the threaded extension 24 of the rack bar 23 is screwed into firm relation with the arm or head 25 of the rack guide way 22 and the jam nut 27 is screwed into firm relation with the upper nut 26 to assist key 36 in maintaining the pinion and gear releasing position of the cam sleeve 29.

After the difficulty which necessitated the disengagement between armature pinion 16 and axle gear 17 has been removed or taken care of, the key 36 is removed from the registering slotway in the motor housing and slotway 45 in the cam sleeve, jam nut 27 and upper or raising nut 26 are released from each other and screwed toward the upper end of the rack extension 24 sufficiently to permit the lower or lowering nut 26 to induce downward movement of the rack bar when the lower nut 26 is properly rotated against the lower side of the arm or head 25 of the rack bar guideway 22. After cam sleeve locking key 36 has been removed, toothed bar 46 is inserted into slotway 45 in the cam sleeve 29 so that an uninterrupted segmental row of teeth 28 may be presented to the rack bar 23 to permit sufficient reverse rotation of cam sleeve 29—namely, in clockwise direction as viewed in Figure 2—to its normal operative position shown in Figure 2, that is with the thick wall portion of the cam sleeve disposed in a direction away from the armature pinion 16, which causes the motor 15 to move toward the drive axle 18 and to move armature pinion 16 into mesh with the axle gear 17 as shown in Figure 2. Locking key 36 is then replaced and secured to the motor housing in the manner heretofore described.

Instead of providing bearing sleeve or bushing 30 with a wide flange for closing the opening in the motor housing, the opening in the side wall of the gear case portion 19 of the motor housing may be provided with a movable collar 47 (see Figure 8) which is of U-shape cross-section and overlaps the inner and outer sides of the side wall of the gear case 19 and is arranged in close bearing relation with the flange of the bearing sleeve or bushing 30; the collar 47 being adapted to prevent escape of oil and having sliding relation with the gear case wall to compensate for axle movement in the journal-boxes.

The gear case portion of the motor in its bottom and preferably in the vertical plane of the outer perimeter of the armature pinion 16 is provided with a vertically disposed baffle or pinion catcher plate 48 (see Figure 5) and a sloping reenforcing plate 49 which slopes downwardly beneath the axle gear 17.

In the event the pinion 16 and the armature shaft fit to which the pinion is secured should break off and fall into the bottom of the gear case, the baffle plate will hold them out of the way of the axle gear; while on the other hand a broken off tooth of the axle gear will be directed to the lower part of the gear case beneath the axle gear and prevented from interfering with the pinion gear 16.

Instead of employing the cam sleeve operating means shown in Figure 2 other means may be employed for rotating the cam sleeve 29 as for example shown in Figures 6 and 7.

In Figure 6 the cam sleeve 29, with the inner bearing bushing 30 keyed thereto, is of the same construction as shown in Figure 4 provided with the circumferentially arranged teeth 28 and the toothed bar 46; the cam sleeve being normally locked to the motor housing by the key 36.

The modification shown in Figure 6 involves a suitable slide or guideway 50 arranged in the gearing casing portion of the motor in a manner similar to that shown in Figure 2. The guideway 50 is provided with a rack bar 51 whose teeth mesh with the teeth 28 on the cam sleeve; the rack bar 51 being of predetermined length to induce a predetermined degree of rotation of the cam sleeve. The rack bar 51 on its opposite side, namely the side disposed away from the cam sleeve side, is shown provided with teeth or notches as shown at 52 with which the extension or head 53 of hand lever 54 engages. The lever 54 is pivotally and preferably removably secured to the suspension cap 20 of the motor housing (there being a suspension cap for each gear casing portion at opposite sides of the motor housing and preferably also two cam sleeves on each drive axle one at each side of the motor housing) by means of a removable bolt or pin as at 55 which extends through an elongated opening or slot 56 to permit retraction of the lever to enable engagement with the succeeding teeth or notches 52 during oscillatory movements of the lever. The lever when not in use is preferably removed and carried in the tool box of the engine and the opening in the wall of the housing closed by a suitable cap or guard to prevent ingress of foreign matter.

The mechanism as shown in Figure 6 is in normal position, namely the position where the enlarged or thick wall of the cam sleeve is located on the side of the axle 18 disposed away from the motor thus permitting the motor to remain in its normal close relation with the axle and hence with the armature pinion 16 in mesh with axle gear 17.

In the event of difficulty, lever 54 is pivotally applied to the motor housing as shown and lever 54 vertically oscillated thereby moving rack 51 upward and causing cam sleeve 29 to rotate counterclockwise in Figure 6 so as to move the thick wall portion toward the opposite side of axle 18, which, by reason of its contact with the motor housing, will press or move the motor toward the truck transom away from the axle 18 sufficiently to move pinion 16 out of mesh with the axle gear 17. It will be understood that the cam sleeve 29 is then locked to the motor housing by inserting key 36 in the slotway 45 from which toothed bar 46 has been removed after the bar occupying portion of the segmental gear 28 has moved beyond the point of engagement with the rack bar.

In Figure 7, I illustrate another modification of cam sleeve operating mechanism wherein the cam sleeve 29 is preferably provided with suitable teeth at 57, arranged in mesh with worm screw 58 rotatably held in place by the bracket-lugs 59 secured to the suspension cap 20 of the motor housing, with one end of the worm screw extending beyond a supporting lug and provided with a wrench receiving surface as for example at 60.

Upon proper rotation of the worm screw 58, the cam sleeve will be rotated as heretofore described and the motor pinion moved out of driving relation or mesh with the axle gear; it being understood that the cam sleeve 29, when in normal position or after having been rotated to pinion and gear disengaging position, is locked to the motor housing against rotation by suitable means as for example the removable key 36.

The drawings disclose various exemplifications of the invention which have been described in terms employed for purposes of description and not as limitations, as modifications may be possible without, however, departing from the spirit of the invention as defined in the appended claims.

What I claim is:

1. Traction motor control mechanism comprising, in combination with an axle hung traction motor whose housing is provided with a pair of lubricant holding suspension caps, an armature pinion and a gear on the drive axle of an engine normally meshing with the pinion, an eccentrically bored two-piece cylindrical sleeve rotatably mounted in the side walls of the motor housing, extending into the suspension caps and rotatable on the axle, said sleeve being provided with window openings on opposite sides and provided with segmental teeth on a predetermined portion of its outer circumference; means arranged in the suspension caps adapted to enter the window-openings in the sleeve whereby the sleeve and axle are lubricated; removable means whereby said sleeve is normally locked to the motor housing against rotation; and means mounted in said housing suspension caps in operative engagement with the segmental teeth of said sleeve, whereby said sleeve may be rotated about the axle when said means is actuated and the motor housing shifted so as to disengage the armature pinion from said gear.

2. Traction motor control mechanism comprising, in combination with an engine drive axle provided with a gear, a traction motor provided with a drive pinion normally meshing with said gear, the motor having a gear and pinion enclosing housing disposed about the axle and suspension caps removably secured thereto, the caps being formed to provide lubricant holding wells with one side of the caps open toward the axle; bearing bushings disposed about the axle and provided in their opposite sides with windows; sectional cam action sleeves disposed about the bushings and keyed thereto, said sleeves having windows registering with the windows of the bushings and provided on a segment at one of their ends with circumferentially arranged teeth, said sleeves and bushings being rotatable about said axle, with the sleeves normally keyed to said housing against rotation; operating mechanism arranged in said housing in mesh with the teeth of said cam action sleeves whereby the latter may be given partial rotation, the motor shifted and said pinion moved out of mesh with said gear; and lubricant applying means arranged in the lubricant holding wells of the suspension caps and disposed through the adjacent registered windows of the bushings and sleeves into contact with the axle.

3. Traction motor control mechanism comprising, in combination with an axle hung motor provided with a pinion, a gear secured on an axle of an engine, and a gear housing secured to the motor whereby the latter is hung on said axle, the gear housing being disposed about the pinion and gear and provided with enlarged openings in its side walls through which the axle extends, a cam sleeve rotatably mounted on the axle with the ends of the sleeve arranged in said wall openings and coextensive therewith, a segmental portion of the sleeve being provided with circumferentially arranged teeth; rack bar reciprocatingly mounted on the motor housing and in mesh with the teeth of said sleeve; means whereby the rack bar may be reciprocated, said cam sleeve partially rotated and the motor housing shifted so as to move said pinion out of mesh with said gear; and means whereby the cam sleeve is locked to said housing and held in its rotated positions.

4. Traction motor control mechanism comprising the combination of a movably mounted axle hung motor provided with a power imparting pinion, a gear secured on the drive axle of an engine and normally meshing with the pinion, the housing of the motor extending about the drive axle and gear for supporting the motor on the axle, the bottom of the housing being provided with a transversely disposed baffle member, sleeves eccentrically mounted on the axle and disposed through the axle-openings in the side walls of the motor housing whereby the latter and said pinion may be shifted in a direction away from the axle gear, segmental portions of the outer ends of said sleeves having teeth; removable keys whereby the sleeves are locked to the housing against rotation and the sleeves held in their rotated positions; and means arranged in mesh with the teeth of the sleeves whereby the latter may be rotated and the operative relation between pinion and gear controlled.

LAURENCE J. BRASHER.